(12) United States Patent
Reese et al.

(10) Patent No.: US 6,302,321 B1
(45) Date of Patent: Oct. 16, 2001

(54) SEALANT LAYER FOR CONTAINER LID

(75) Inventors: Barry R. Reese, Hartsville; Jeffrey M. Schuetz, Florence; Alan D. Williams, Camden, all of SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/416,194

(22) Filed: Oct. 11, 1999

(51) Int. Cl.$^7$ ....................................................... B65D 3/26
(52) U.S. Cl. ..................... 229/123.1; 156/69; 220/359.3; 229/5.5
(58) Field of Search ................... 229/5.5, 123.1, 229/123.2; 220/359.2, 359.3, 359.4; 156/69; 53/289, 478, 485

(56) References Cited

U.S. PATENT DOCUMENTS

| | | | |
|---|---|---|---|
| 4,171,084 | * 10/1979 | Smith | 220/359.3 |
| 4,280,653 | 7/1981 | Elias . | |
| 4,452,842 | * 6/1984 | Borges et al. | 220/359.3 |
| 4,557,414 | * 12/1985 | Ford et al. | 229/5.5 |
| 4,784,885 | * 11/1988 | Carespodi | 229/123.2 |
| 4,966,810 | 10/1990 | Strait et al. . | |
| 4,980,210 | 12/1990 | Heyes . | |
| 4,994,324 | 2/1991 | Bose et al. . | |
| 5,079,052 | 1/1992 | Heyes et al. . | |
| 5,100,708 | 3/1992 | Heyes et al. . | |
| 5,126,176 | 6/1992 | Blaskovitz et al. . | |
| 5,217,812 | 6/1993 | Lee . | |
| 5,219,649 | 6/1993 | Nishino et al. . | |
| 5,318,829 | 6/1994 | Tada et al. . | |
| 5,324,555 | 6/1994 | Hughart et al. . | |
| 5,356,677 | 10/1994 | Meilhon et al. . | |
| 5,432,235 | 7/1995 | Arsac et al. . | |
| 5,466,498 | 11/1995 | Forloni et al. . | |
| 5,556,674 | 9/1996 | Meilhon . | |
| 5,591,520 | 1/1997 | Migliorini et al. . | |
| 5,620,802 | 4/1997 | Arsac et al. . | |
| 5,693,424 | 12/1997 | Watanabe et al. . | |
| 5,741,594 | 4/1998 | Jialanella . | |
| 5,744,250 | 4/1998 | Lee et al. . | |
| 5,827,615 | 10/1998 | Touhsaent et al. . | |
| 5,829,669 | 11/1998 | Drummond et al. . | |
| 5,843,502 | 12/1998 | Ramesh . | |
| 5,846,619 | 12/1998 | Cahill et al. . | |
| 5,979,748 | * 11/1999 | Drummond et al. | 229/123.1 |

FOREIGN PATENT DOCUMENTS 0 952 087 A2  10/1999  (EP) .
1 002 731 A1  5/2000  (EP) .

* cited by examiner

Primary Examiner—Gary E. Elkins
(74) Attorney, Agent, or Firm—Alston & Bird LLP

(57) ABSTRACT

A sealed composite container for products is provided having a paperboard body ply with a liner ply adhered on the inner surface thereof. One end of the container is rolled outwardly to form a rim and exposing the inner surface of the liner ply. A lid is heat sealed to the rim of the container. The dual-layer sealant composition layer of the lid comprises a base layer, such as high density polyethylene, and an adjacent frangible layer, such as ethylene-methyl acrylate copolymer, the frangible layer being operatively positioned for heat sealing to the rim of the container.

52 Claims, 7 Drawing Sheets

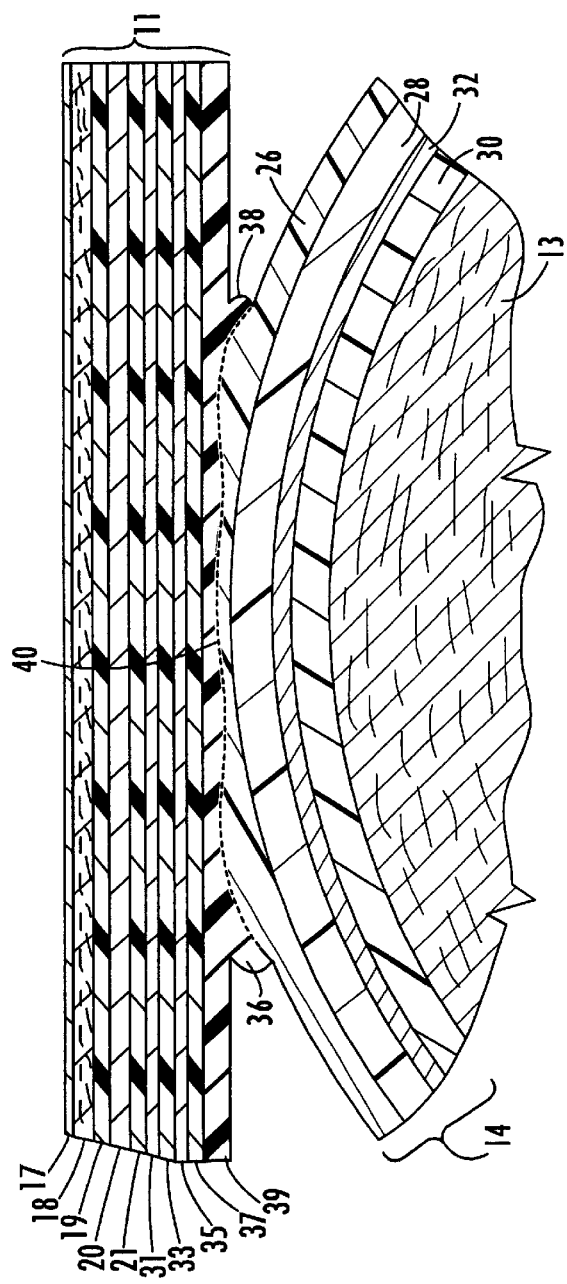
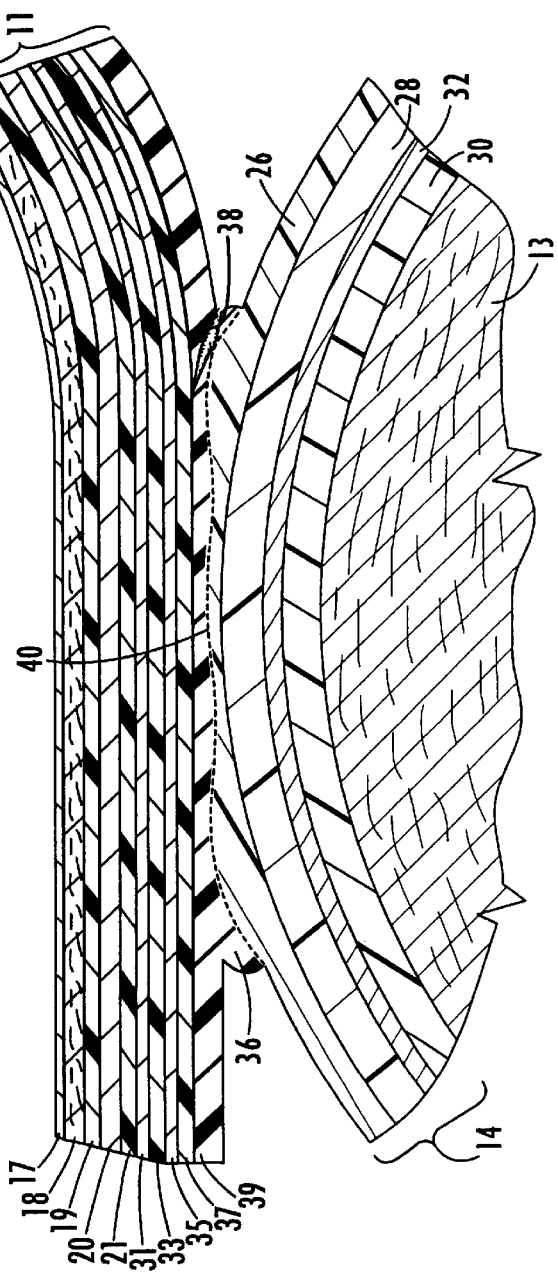
FIG. 4A.
FIG. 4B.

SEALANT LAYER FOR CONTAINER LID

FIELD OF THE INVENTION

The present invention relates to food containers and methods and apparatus for making food containers, such as composite cans, and more particularly relates to sealant layers suitable for use in sealing such containers.

BACKGROUND OF THE INVENTION

Food and drink products and other perishable items are often packaged in tubular containers, which are sealed at both ends. These tubular containers typically include at least one structural body ply and are formed by wrapping a continuous strip of body ply material around a mandrel of a desired shape to create a tubular structure. The body ply strip may be spirally wound around the mandrel or passed through a series of forming elements so as to be wrapped in a convolute shape around the mandrel. At the downstream end of the mandrel, the tube is cut into discrete lengths and is then fitted with end closures to form the container.

Tubular containers of this type typically include a liner ply on the inner surface of the paperboard body ply. The liner ply prevents liquids, such as juice, from leaking out of the container and also prevents liquids from entering the container and possibly contaminating the food product contained therein. Preferably, the liner ply is also resistant to the passage of gasses, so as to prevent odors of the food product in the container from escaping and to prevent atmospheric air from entering the container and spoiling the food product. Thus, the liner ply provides barrier properties and the body ply provides structural properties.

In addition, current commercial containers often have membrane-type lids or end closures heat sealed to a rim of the composite container wall to form a peelable seal. The rim is formed by turning out the end of the container to position the inner layer of the liner material on the outwardly curved surface.

A major difficulty in developing a usable heat seal between the container lid and the rim of the container wall is balancing bond strength with ease of opening for the end user. During transport, the sealed containers experience temperature and pressure extremes that stress the heat seal and can lead to rupturing of the container. The bond strength must be sufficient to withstand the rigors of transportation. In particular, when containers packaged and sealed at one elevation are then subjected to lower ambient air pressure, such as during air transportation or when transported to consumers at higher elevations, a relative positive pressure is created within the container which could cause the seal between the lid and the container to rupture. This ability of the container to avoid rupturing under such conditions is known as burst strength. However, as the burst strength increases, there is generally a concomitant increase in difficulty of opening of the container, which is exhibited by the peel strength or peel resistance of the container. The higher burst strength indiscriminately prevents both rupturing during transport and opening by the end user.

Certain types of heat sealable coatings have been used in both the lidding and liners of conventional containers. For example, SURLYN® polymer, a product of Dupont, is a material known in the art and is commonly used as a heat seal coating. Typically, the layer of the container and the layer of the membrane that contact each other are constructed of SURLYN® polymer. These two layers of SURLYN® polymer are heat sealed along the top surface of the container bead. The two SURLYN® polymer layers create an extremely strong bond layer that remains relatively uniform in thickness across the seal area. Due to the strong cross-linked bond created by SURLYN® polymer, however, opening the container can require a peel force which is too high for some consumers and usually results in tearing and exposure of the other layers of the container wall, such as the paperboard body wall, as is illustrated in U.S. Pat. No. 4,280,653 to Elias. This gives the top of the container a ragged, undesirable appearance.

In co-pending application, U.S. Ser. No. 09/065,783, which is assigned to the assignee of the present invention and incorporated by reference in its entirety, the formation of two heat seal beads is described. The two beads comprise an inner heat seal bead and an outer heat seal bead, each heat seal bead being formed of the heat sealable polymers of the seal layers of the membrane and the liner. The two beads are formed by using heat and pressure to force the heat sealable polymers to flow away from the central portion of the heat seal area and towards the interior and exterior of the container. The reduction in the amount of heat seal material in the central heat seal area reduces the bond strength in the central heat seal area and allows opening of the container without unsightly tearing of the liner and exposure of the paperboard layer of the container wall. However, formation of the beads according to the co-pending application does not entirely erase the difficulty of balancing burst strength and ease of opening.

It would be advantageous to provide a sealed container and method for sealing a container that combine improved ease of opening and an attractive appearance after opening with the seal strength and barrier properties required for protection of the products within the container.

SUMMARY OF THE INVENTION

The composite container of the present invention successfully balances the need for ease of opening with the burst strength necessary to maintain a hermetic seal despite changes in pressure routinely experienced during transportation of the container. The lid or closure sealed to the top of the composite container of the present invention includes a dual-layer sealant composition that provides the necessary combination of ease of opening and burst strength. The sealant composition comprises a base layer and an adjacent frangible layer. Preferably, the base layer comprises high-density polyethylene and the frangible layer comprises an ethylene-methyl acrylate copolymer. The frangible layer of the lid is sealed to the liner ply of the tubular container such that the bond strength between the frangible layer of the lid and the liner ply is greater than the bond strength between the frangible layer and the base layer. Thus, the lid of the present invention provides a peelable seal wherein the portion of the frangible layer that is heat sealed to the container delaminates from the base layer such that the heat sealed portion of the frangible layer remains sealed to the rim of the container.

The present invention provides a sealed composite container comprising a tubular body member that includes at least one paperboard body ply and a liner ply adhered to the inner surface of the tubular body member. At least one end of the body member and the liner ply are rolled outwardly to form a rim and expose the liner ply. The sealed container further comprises a lid or closure operatively positioned adjacent to the rim and heat sealed thereto. The lid comprises the dual-layer sealant composition described above operatively connected to a barrier layer designed to prevent the passage of undesirable substances into and out of the container. The term "operatively connected" is intended to encompass any embodiments wherein the two designated layers are part of the same multi-layer lid, but are not necessarily adjacent to each other. Although some preferred configurations of the lid are described herein, unless otherwise indicated, the relative position of the layers of the lid is not critical to the present invention. The frangible layer is positioned so as to face the rim for heat sealing thereto. The heat seal created between the rim and the lid has sufficient burst strength to maintain a hermetic seal when exposed to a vacuum of ten inches of Hg at room temperature for thirty minutes.

Preferably, the base layer is between 0.1 and 1.0 mil in thickness, most preferably about 0.5 mil in thickness. The frangible layer is preferably between about 0.5 and about 2.0 mil in thickness, and most preferably about 1.5 mil in thickness. If the frangible layer is an ethylene-methyl acrylate copolymer, the frangible layer preferably comprises between about 15 and about 25 weight percent methyl acrylate, and more preferably about 20 to about 25 weight percent methyl acrylate. The base layer and frangible layer may be formed as a coextrusion coating on the next adjacent layer of the lid. Alternatively, if the base layer and frangible layers are blown films, the two layers may be laminated to the next adjacent layer of the lid, such as by adhesive lamination, extrusion lamination or coextrusion lamination.

The lid may further comprise additional layers. For example, the lid may include a support layer operatively connected to the barrier layer. Additionally, the lid structure may include a kraft paper layer also operatively connected to the barrier layer. In one embodiment, the kraft paper carries printed indicia on a surface thereof.

Methods of manufacturing the lid and the tubular container are also provided. In a method of manufacturing the lid, a support layer substrate having a first surface and a second surface is provided. A barrier layer is adhered to the first surface of the support layer substrate. A paper layer is adhered to the exposed surface of the barrier layer. Additionally, the dual-layer sealant composition is adhered to the second surface of the support layer substrate. Preferably, a primer coating is applied to the first surface of the support layer substrate and then dried prior to adhering the barrier layer to the first surface of the support layer substrate.

The barrier layer may be adhered to the support layer substrate by advancing the two layers to a lamination nip and also directing a coextruded polymer composition into the same nip. The two layers are laminated together with the coextruded polymer composition therebetween.

Similarly, the paper layer may be adhered to the barrier layer by advancing the two layers to a lamination nip and also directing a coextruded polymer composition into the same nip. The barrier layer and the paper layer are laminated together with the coextruded polymer composition therebetween.

The dual-layer sealant composition may be adhered to the support layer substrate by applying an adhesive composition to either a surface of the support layer substrate or a surface of the sealant composition. Thereafter, the sealant composition and the support layer substrate may be laminated together with the adhesive composition therebetween. For example, the adhesive composition may comprise a thermosetting adhesive, an extruded polymer composition or a coextruded polymer composition. In another embodiment, the dual-layer sealant composition is applied to the support layer substrate as a coextrusion coating. A layer of indicia may be printed on an exposed surface of the paper layer.

In a method of manufacturing a sealed container according to the present invention, a tubular member is provided comprising at least one paperboard body ply and a liner ply adhered to the inner surface of the body ply. At least one end of the tubular member is rolled outwardly to form a rim and expose the liner ply. A lid is also provided for closing the end of the tubular member. In one embodiment, the lid comprises a barrier layer and the dual layer sealant composition described above. The lid is positioned against the rim such that the frangible layer contacts the liner ply. The sealant composition is heated under conditions sufficient to render at least a portion of the frangible layer flowable. The flowable portion of the frangible layer is then sealed to the rim such that the lid is hermetically sealed to the liner ply.

BRIEF DESCRIPTION OF THE DRAWINGS

Some of the objects and advantages of the present invention having been stated, others will appear as the description proceeds when taken in conjunction with the accompanying drawings, which are not necessarily drawn to scale, wherein;

FIG. 4A is a greatly enlarged sectional view of the sealed end of a container of the present invention taken along lines 4A—4A of FIG. 1;

FIG. 4B is a greatly enlarged sectional view of the heat seal of the present invention illustrating the initiation of a tear in the sealant composition during the opening of the container;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
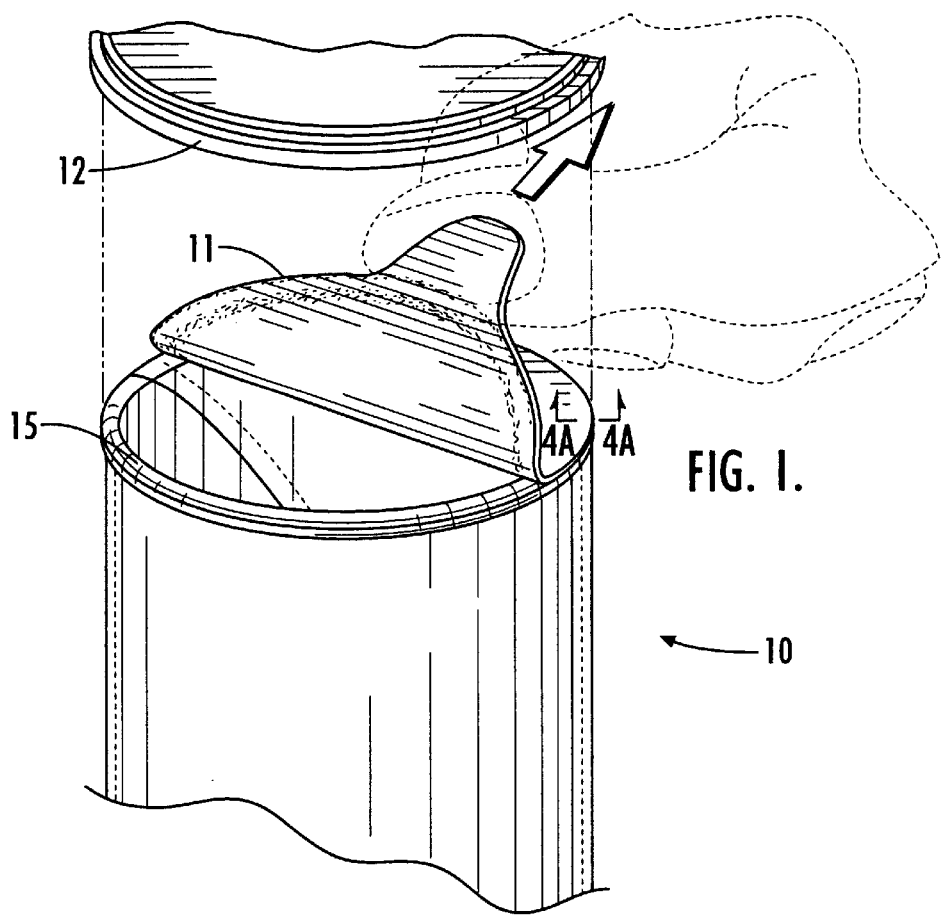
FIG. 1 is a fragmentary perspective view of a container of the present invention illustrating the opening mechanism whereby the liner ply is not torn through to the underlying paperboard.

A tubular container 10 according to the present invention is illustrated in FIG. 1. Although illustrated as having a circular cross section, the tube may have any cross sectional shape, which can be formed by wrapping the tube around an appropriately shaped mandrel. One example is a generally rectangular shaped tube having rounded corners.

The embodiment illustrated in FIG. 1 is particularly advantageous for packaging snacks, such as potato crisps, and includes a flexible lid or closure 11, also referred to as a membrane-type lid, and a reusable plastic end cap or closure 12 over the seal. Various other end closures may be used; however, depending upon the type of food product that is to be packaged such as, for example, dough.

Figure 2:
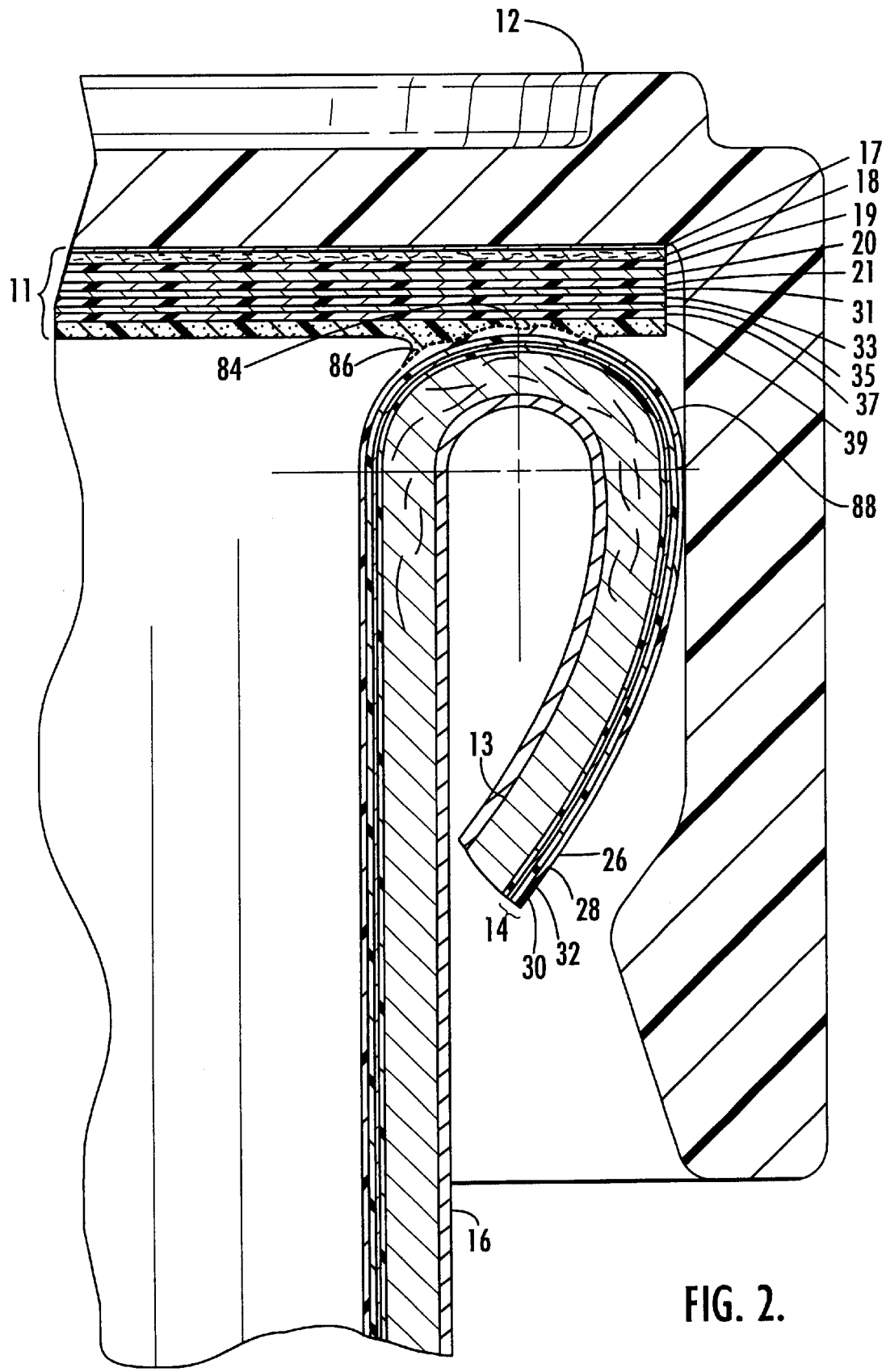
FIG. 2 is a fragmentary and enlarged view of the sealed end of the tubular container of an embodiment of the present invention.

As illustrated in more detail in FIG. 2, the tubular container includes a wall having a body ply 13 which is preferably formed of paperboard and a liner ply 14 which is preferably formed of a polymeric material adhered to the inner surface of the body ply 13. As noted above, the drawings are not necessarily drawn to scale and some of the various layers of the present invention are shown greatly enlarged to facilitate better clarity in the drawings. If desired, a label ply 16 may be adhered to the outer surface of the body ply 13. The upper end of the tubular container 10 is rolled over so as to form a rim 15. The lid 11 is hermetically sealed to the top of the rim 15 as discussed below. The end cap 12 is then snapped over the rim 15 and may be reused after the lid 11 has been removed. A closure (not illustrated), for example a metal closure, can be secured to the opposite end of the container 10.

Figure 3:
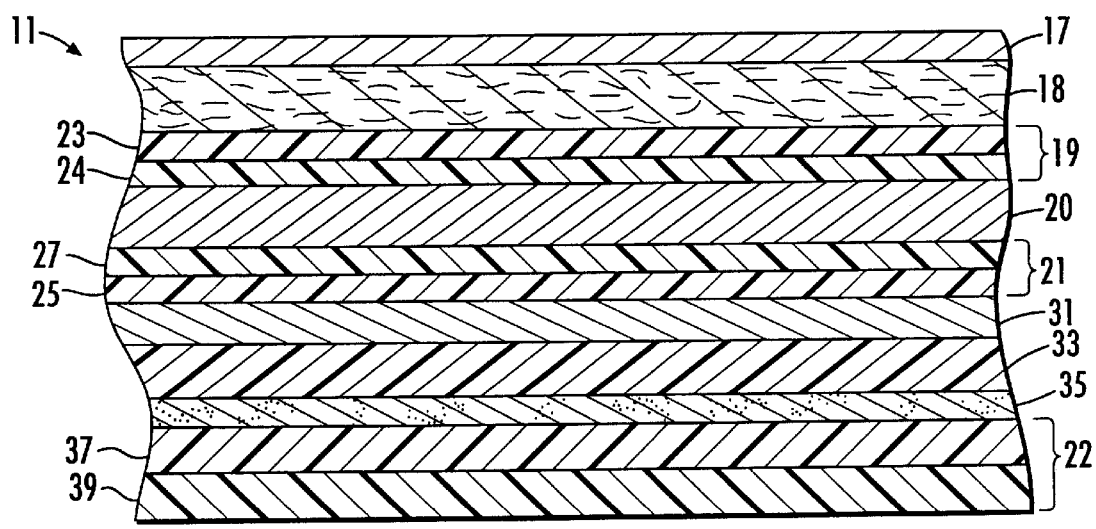
FIG. 3 is a fragmentary and greatly enlarged cross-sectional view of an embodiment of the container lid of the present invention.

The lid 11 is constructed of multiple layers. A preferred embodiment of the lid 11 of the present invention is shown in FIG. 3. As shown, the lid 11 includes a paper or paperboard layer 18, such as a machine glazed, bleached kraft paper layer. The outer exposed surface of the paperboard layer 18 may optionally carry printed indicia 17.

A barrier layer 20 is also provided that serves as a barrier to the passage of liquids and/or gasses such as oxygen. If a barrier is required for both liquids and gasses, the barrier material is preferably selected from the group consisting of metal foil, such as aluminum foil, polyethylene terephthalate, modified polyethylene terephthalate, polyethylene napthalate, polyamide, metallized polyester, metallized polypropylene, metallized polyamide and mixtures thereof. Suitable barrier layer 20 materials include foil, polyamide, metallized polyamide, polyvinylidiene chloride, polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol and mixtures thereof. The barrier layer 20 is preferably adhered to the paperboard layer 18 using adhesive composition 19. The adhesive composition 19 may be any suitable adhesive composition known in the art. Preferably, the adhesive composition 19 is a coextruded polymer composition comprising a low density polyethylene (LDPE) layer 23 adjacent to the paper layer 18 and an ethylene methacrylic acid (EMAA) layer 24 adjacent to the barrier layer 20. Alternatively, the adhesive composition 19 may comprise a polyurethane.

As shown in FIG. 3, a preferred embodiment of lid 11 also includes a support layer 33. The support layer 33 provides rigidity and tear resistance. Preferably, the support layer 33 comprises polyethylene terephthalate, polyamide, polyethylene, polypropylene, foil or metallized versions thereof. The support layer 33 is adhered to the barrier layer 20 using adhesive composition 21. The adhesive composition 21 may be constructed of any suitable adhesive composition known in the art. Preferably, the adhesive composition 21 comprises a coextruded polymer composition that includes an EMAA layer 27 and a LDPE layer 25, wherein the EMAA layer 27 is adjacent to the barrier layer 20 and the LDPE layer 25 is facing the support layer 33. In a preferred embodiment, a primer layer 31 is disposed between the adhesive composition 21 and the support layer 33. The primer layer 31 preferably comprises a material selected from the (group consisting of polyurethane and polyethylene-imine (PEI).

Advantageously, the lid 11 further includes a seal layer 22. In one embodiment, as shown in FIG. 3, the seal layer 22 is adhered to the support layer 33 by adhesive composition 35. The adhesive composition 35 may be constructed of any suitable adhesive composition known in the art. Preferably, the adhesive composition 35 is selected from the group consisting of thermosetting adhesives, such as polyurethanes, extruded polymer compositions, or coextruded polymer compositions, such as the coextruded compositions described above for use as adhesive compositions 19 and 21.

The seal layer 22 is a dual-layer sealant composition comprising a base layer 37 and a frangible layer 39 adjacent to the base layer. The frangible layer 39 is positioned as an outermost layer of lid 11 in order to contact the rim 15 of the container 10 for heat sealing thereto. The base layer 37 preferably comprises a polymeric material capable of adhering to the frangible layer 39 of the lid. Advantageously, the base layer 37 is selected from the group consisting of high density polyethylene, polypropylene and polystyrene.

The frangible layer 39 preferably comprises a heat flowable polymeric material that is capable of creating a fusion seal to the rim 15 of the container 10. The frangible layer 39 should be capable of sealing to the liner ply 14 of the tubular container 10 such that the bond strength between the frangible layer and the liner ply is greater than the bond strength between the frangible layer and the base layer 37. Thus, as described more fully below, the lid 11 of the present invention provides a peelable seal, wherein the portion of the frangible layer 39 that is heat sealed to the rim 15 delaminates from the base layer 37 such that the heat sealed portion of the frangible layer remains sealed to the rim of the container 10. Preferably, the frangible layer 39 is selected from the group consisting of ethylene-methyl acrylate copolymer (EMA), ionomeric polymers, such as SURLYN® polymer, ethylene-vinyl acetate, ethylene methacrylic acid (EMAA) and ethylene acrylic acid (EAA).

The base layer 37 is preferably between about 0.1 and about 1.0 mil in thickness. In one embodiment, the base layer 37 is about 0.5 mil in thickness. The frangible layer 39 is between about 0.5 and 2.0 mil in thickness. In one embodiment, the frangible layer 39 is about 1.5 mil in thickness. If the frangible layer 39 comprises an ethylene-methyl acrylate copolymer, the copolymer preferably comprises about 15 to about 25 weight percent methyl acrylate, more preferably about 20 to about 25 weight percent methyl acrylate.

The seal layer 22 may be used in the form of a coating, such as a coextrusion coating, or a film, such as a blown film.

For example, the two layers of the seal layer 22 may be formed as a coextrusion coating on the next adjacent layer of the lid 11, such as the support layer 33. Alternatively, the two layers of the seal layer 22 may comprise blown films laminated to the next adjacent layer of the lid 11 using an adhesive composition, such as adhesive composition 35 described above. Preferably, the seal layer 22 comprises a high density polyethylene (HDPE) layer 37 and an EMA layer 39. If the EMA layer is a blown film, the melt flow index of the EMA layer 39 is preferably between about 1.0 and about 4.0. If the EMA layer 39 is an extrusion coating grade, the preferred range of melt flow index is about 5.0 to about 12.0.

A commercially available material suitable for use as the base layer 37 is 9608 resin sold by Chevron. A commercially available material suitable for use as the frangible layer 39 is 2255 or 2205 resin sold by Chevron.

The seal layer 22 of the lid 11 is preferably between about 0.6 and about 3.0 mils in total thickness, most preferably about 1.5 mils to about 3.0 mils in thickness. The seal layer 22 has a weight between about 10 to about 50 lbs./3000 ft$^2$ and preferably about 20 to about 40 lbs./3000 ft$^2$. Most preferably, the seal layer 22 has a weight of about 25 lbs./3000 ft$^2$ to about 40 lbs./3000 ft$^2$. The seal layer 22 is relatively thick so as to prevent natural variations in the container manufacturing process from affecting the consistency of the heat seal. For example, imperfections in the rim 15 and variations in the container height have a significant effect on the sealing process. The seal layer 22 of the present invention provides enough heat seal material to fill any cracks and fissures created in the rim 15 and is also able to create a continuous seal around seams in the container wall, such as the seams created by anaconda folds or overlap seams in the liner. The additional seal material also contributes to better sealing by compensating for slight differences in container height that might otherwise lead to a reduction in seal strength. Further, the seal layer 22 is thick enough to allow creation of a heat seal despite the presence of contaminants introduced into the heat seal area during the manufacturing process, such as wax. Also, by using a thicker seal layer, the heat seal may be formed at lower sealing temperatures.

The liner ply 14 is also typically constructed of multiple layers. The composition of the liner ply 14 is not critical to the present invention. Preferably, one of the layers forms a barrier to moisture and/or gasses, depending on the application. It will be understood that various barrier materials and liner plies could be employed depending upon the item being packaged. For example, conventional liners include a layer of foil backed with kraft paper. However, in a preferred embodiment, the liner ply 14 is substantially entirely formed of polymeric material. In particular, liner plies such as described in U.S. Pat. No. 5,829,669 to Drummond et al. or U.S. Pat. No. 5,846,619 to Cahill et al., both of which are assigned to the assignee of the present invention and are hereby incorporated by reference, may be used.

In the embodiment illustrated in FIG. 2, the liner ply 14 includes a seal layer 26, a moisture barrier layer 28 and an adhesive layer 30. The barrier layer 28 is resistant to the passage of liquids and gasses such as oxygen. If a high barrier is required for both liquids and gasses, preferred barrier materials are metallized polyester or metallized polypropylene. Some food products, such as juices, do not require a gas barrier and other barrier materials may be used (although the barrier may also be generally resistant to the passage of gasses). It will be understood that various barrier materials could be employed depending upon the item being packaged. For example, suitable barrier materials include foil, polyamide, metallized polyamide, polyvinylidiene chloride, polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol, mixtures thereof and the like, as will be apparent to the skilled artisan.

One surface of the barrier layer 28 may include a thin metallized coating 32 to provide a metallic appearance and also to enhance the barrier properties. The metallized coating 32, which may be formed of aluminum, is significantly thinner than a foil layer, however, and is not necessary for strength or barrier properties in certain applications.

An adhesive layer 30 is below the metallized coating 32 and defines the radially outermost surface of the liner ply 14. The adhesive layer 30 may have multiple layers coextruded together. The adhesive layer 30 may be selected from the group consisting of metallocenes, ethylene-methacrylic acid, ethylene methyl acrylate, ethylene butyl acrylate, ethylene acrylic acid, ethylene vinyl acetate, and blends, mixtures and copolymers thereof.

Figure 7:
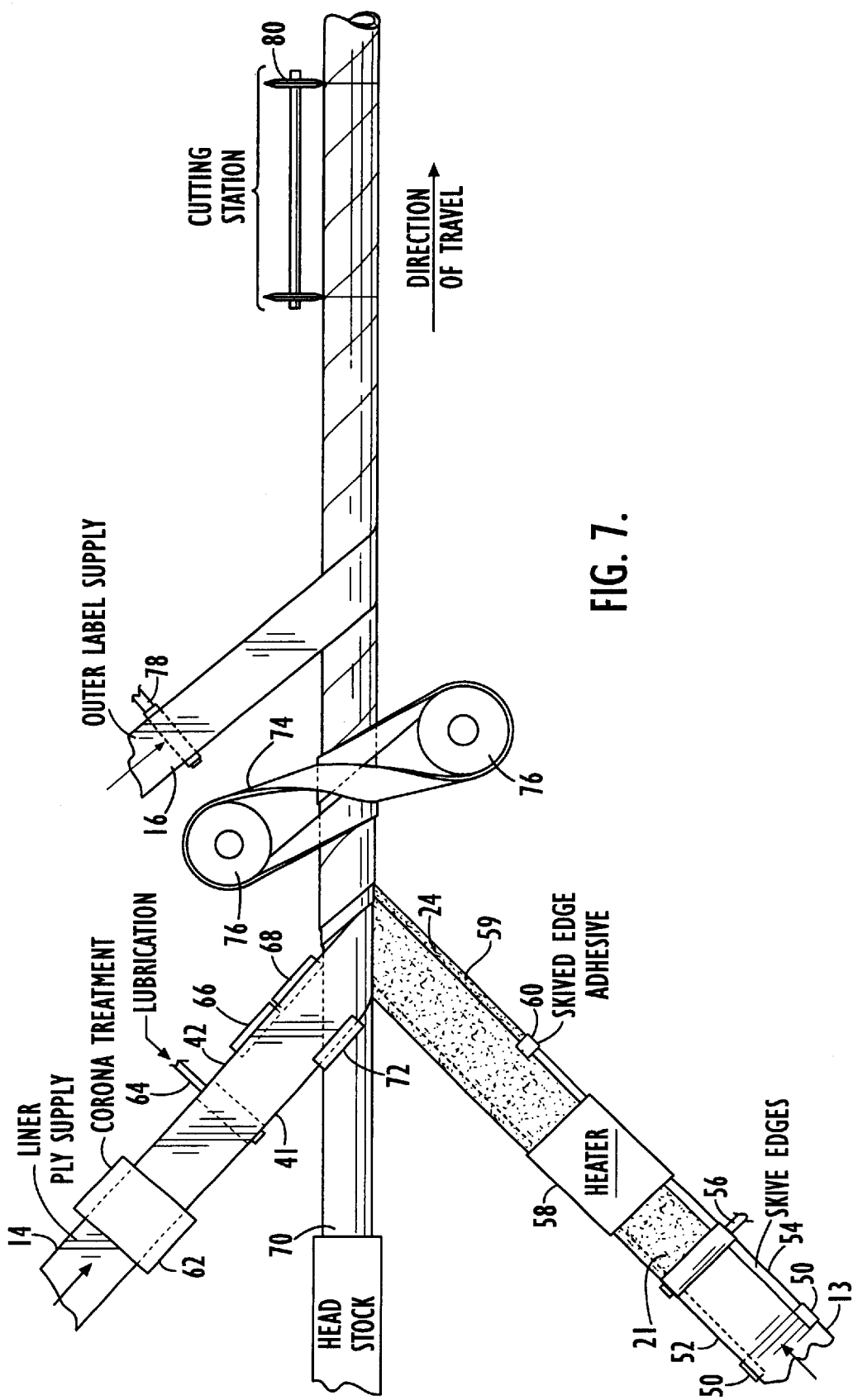
FIG. 7 is a plan view of an embodiment of an apparatus for making a tubular container according to the present invention.

In one embodiment, a seal layer 26 defines the radially innermost surface of the liner ply 14. The seal layer 26 provides a surface against which the adhesive layer 30 is adhered when a first marginal edge portion 41 of the liner ply 14 is brought into an overlapping relationship with a second marginal edge portion 42, as shown in FIG. 7. The seal layer 26 also forms the heat seal between the lid 11 and the liner 14 in conjunction with the seal layer 22 of the lid.

The seal layer 26 of the liner ply 14 is preferably constructed of a heat sealable material selected from the group consisting of high density polyethylene, low density polyethylene, metallocene-catalyzed polyolefins, such as metallocene-catalyzed polyethylene, and mixtures or blends thereof. In embodiments of the seal layer 26 including a polyolefin polymer, the polyolefin is preferably high density polyethylene or a high density polyethylene blend containing up to 30% low density polyethylene. The seal layer 26 of the liner ply 14 preferably has a melting point within the range of about 110° C. and about 140° C. Most preferably, the seal layer 26 has a melting point between about 120° C. and 130° C. In some embodiments, the seal layer 26 of the liner ply 14 is not needed. Instead, the heat seal between the lid 11 and the liner 14 is formed entirely by the seal layer 22 of the lid 11.

FIG. 2 illustrates the sealed end of the tubular container of a preferred embodiment of the present invention wherein the two seal layers, 22, 26 are heat sealed together. As shown in greater detail in FIG. 4A, a sealed composite container 10 for products is provided having a heat seal between the liner ply 14 and the lid 11 in the form of an inner heat seal bead 36 and an outer heat seal bead 38. The inner heat seal bead 36 and the outer heat seal bead 38 are formed of the frangible layer 37 of the seal layer 22 of the lid 11 and the seal layer 26 of the liner ply 14 (if present). The heat sealable compositions of both seal layers 22, 26 are displaced outwardly from the intermediate region during the heat sealing operation and are cooled to form the beads 36, 38. The inner heat seal bead 36 faces the interior of the tubular container 10 and the outer heat seal bead 38 is disposed on the opposite side of the heat seal area from the inner heat seal bead 36. When cooled, the heat seal comprises a thin intermediate region 40 between the inner heat seal bead 36 and the outer heat seal bead 36. The inner and outer beads 36, 38 maintain double barriers against the passage of liquids and gasses so that a hermetic seal is maintained. The intermediate region 40 preferably has a lower bond strength than the inner heat seal bead 36 and the outer heat seal bead 38. The width of the intermediate region 40 is about 0 to about 30 microns. The term "bead" as used herein is intended to be distinguished from prior containers having a relatively flat heat seal where very little, if any, flowing of the heat seal compositions occurs. In addition, this embodiment is not limited to use with only liners having a straight overlapping seam, but the heat seal beads 36, 38 could also be used with an anaconda fold seam. A preferred construction of this type is disclosed in U.S. patent application Ser. No. 09/065,783 entitled "Tubular Container With a Heat Seal Having an Inner and Outer Bead and Method of Manufacturing Said Container," which is assigned to the assignee of the present invention and expressly incorporated herein by reference.

In effect, the inner heat seal bead 36 and the outer heat seal bead 38 provide a double seal having a high tensile or burst strength. The burst strength of the bead seals gives the container 10 a strong seal against forces acting upon the container in a direction normal to the heat seal (i.e., normal to the plane defined by the end of the tubular container 10). Since most forces acting upon a container during storage and transit will occur normal to the heat seal area, the high burst strength of the inner heat seal bead 36 and outer heat seal bead 38 of the present invention is especially advantageous for use with product containers.

Burst strength may be tested using an altitude chamber. Typically, the sealed container 10 is placed in the altitude chamber and then subjected to an external partial vacuum for a predetermined period of time to determine whether the heat seal is capable of withstanding differences between interior container pressure and external air pressure. Suitable testing conditions include subjecting the container to a vacuum of 10 in. of Hg for 30 minutes at room temperature. The containers 10 of the present invention are capable of maintaining a hermetic seal during a thirty minute exposure to a vacuum of 10 in. of Hg at room temperature.

Notwithstanding the high burst strength, the peel strength of the heat seal formed according to the present invention is relatively low, resulting in a container that exhibits relative ease of opening This is in contrast to conventional containers where two SURLYN® polymers are jointly crosslinked together in a relatively flat heat seal, resulting in a bond that is sufficient to tear the liner 14 when removing the lid 11 (rather than tearing through the SURLYN® polymer). The preferred range for peel strength is about 5 to about 10 lbs./linear inch and in particular about 7 to about 10 lbs./linear inch. Thus, the heat seal of the present invention combines the tensile and shear strength necessary to prevent unwanted breaches of the tubular container 10 with relatively low peel strength for ease of opening by the consumer.

Figure 4C:
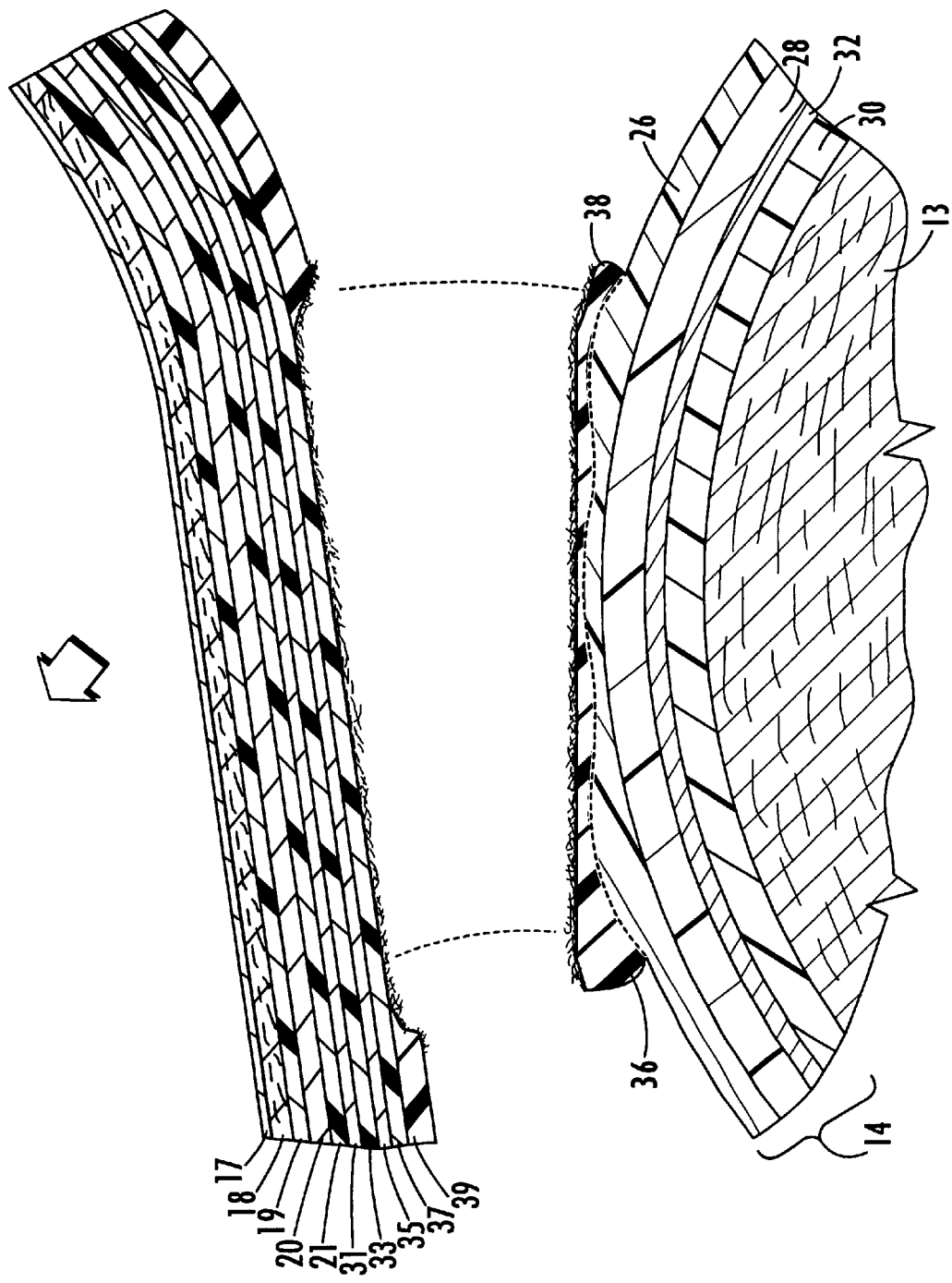
FIG. 4C is a greatly enlarged sectional view of the heat seal of the present invention after the container has been opened.

FIGS. 4A–4C illustrate the opening mechanism for container 10 of the present invention As shown by FIGS. 4B and 4C, the shearing force generated during opening of the container 10 causes a tear to propagate through the frangible layer 39 of the seal layer 22 of the lid 11 and to the adjacent surface of the base layer 37. As shown in FIG. 4C, the tear continues to propagate along the surface of the base layer 37 adjacent to the frangible layer 39. Thus, the portion of the frangible layer 39 that is heat sealed to the rim 15 of the container 10 remains adhered to the rim upon removal of the lid 11. When the tubular container 10 of the present invention is opened, unsightly tears through the barrier layer 28 of the liner ply 14 do not occur.

It has been discovered that the inner bead 36 of the double bead seal provides the primary resistance to tensile forces acting upon the container, such as those burst forces generated by changes in internal pressure during transport. However, the outer bead 38 provides the primary resistance to opening by peeling of the peelable heat seal formed between the lid 11 and the liner ply 14. As a result, it has been discovered that the heat seal is advantageously formed having a larger inner bead 36 and a smaller outer bead 38. The resulting container exhibits both improved ease of opening by virtue of the smaller outer bead 38 and improved burst strength for withstanding the rigors of transportation by virtue of the larger inner bead 36.

The heat seal of the present invention has an inner bead 36 having a greater width than the outer bead 38. Bead width is defined as the distance between the base layer 37 of the lid 11 and the barrier layer 28 of the liner ply 14 measured at the longest point across the bead in the vertical plane. A preferred construction is disclosed in U.S. patent application Ser. No. 09/416,184, filed concurrently herewith and entitled "Tubular Container With a Heat Seal Having Non-Symmetrical Inner and Outer Beads." This application is assigned to the assignee of the present invention and is expressly incorporated herein by reference.

As shown in FIG. 2, the rim 15 of the container 10 is rolled outwardly to expose the heat seal layer 26 of the liner 14. The rim 15 creates a heat seal surface that contacts the frangible layer 57 of the lid 11. The heat seal surface includes an apex portion 84, an inner portion 86 sloping away from the apex portion and toward the interior of the container 10, and an outer portion 88 sloping away from the apex portion and toward the exterior of the container. Preferably, the inner portion 86 slopes away from the apex portion 84 at a greater rate than the outer portion 88. This rim 15 design encourages the inner bead 36 to extend further down the heat seal surface toward the interior of the container 10 and discourages the outer bead 38 from extending down the heat seal surface toward the exterior of the container. In this manner, the shape of the rim 15 affects the direction of flow of the heat sealable compositions and the relative shapes of the inner bead 36 and outer bead 38. By encouraging flow of the heat sealable compositions further down the heat seal surface toward the interior of the container, better burst strength is obtained due to the anchoring effect of the inner bead 36. Additionally, peel strength is maintained at a reasonable level because the incline or slope of the heat seal surface toward the exterior of the can is lesser in degree and does not encourage flow of the heat sealable compositions in that direction. As desired, the above-described shape of the rim 15 maintains the outer bead 38 at a relatively smaller size as compared to the inner bead 36. It is believed that the shape of the inner bead 36 creates a shear component of resistance which counters the forces caused by internal container pressure more effectively than the more tensile resistance of prior art designs. The desired rim 15 shape can be formed during the initial formation of the container rim or by a secondary forming process. Alternatively, the desired rim 15 shape may be formed in conjunction with the heat sealing operation. In addition, the rim 15 can be shaped to have a substantially planar portion as disclosed in U.S. patent application Ser. No. 09/416,169, filed concurrently herewith and entitled "Container With Heat Seal Having a Substantially Planar Portion." This application is assigned to the assignee of the present application and is expressly incorporated herein by reference.

Figure 5A:
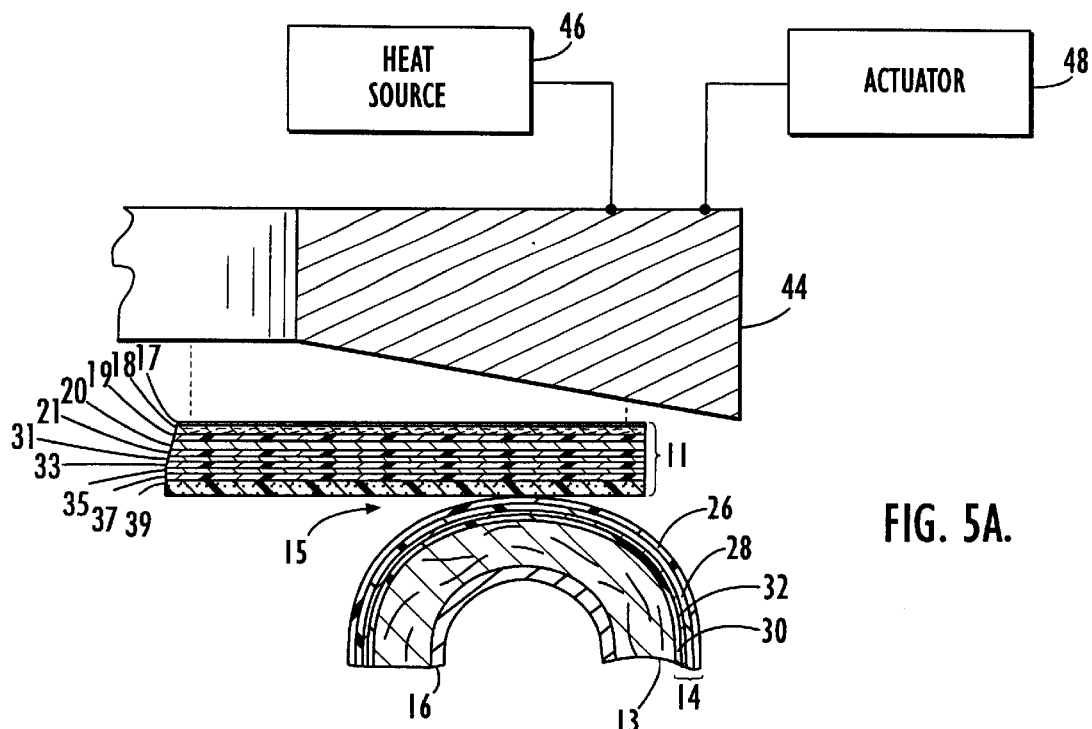
FIG. 5A is an enlarged sectional view of the heat-sealing apparatus of the present invention prior to contact with the container of the present invention.
Figure 5B:
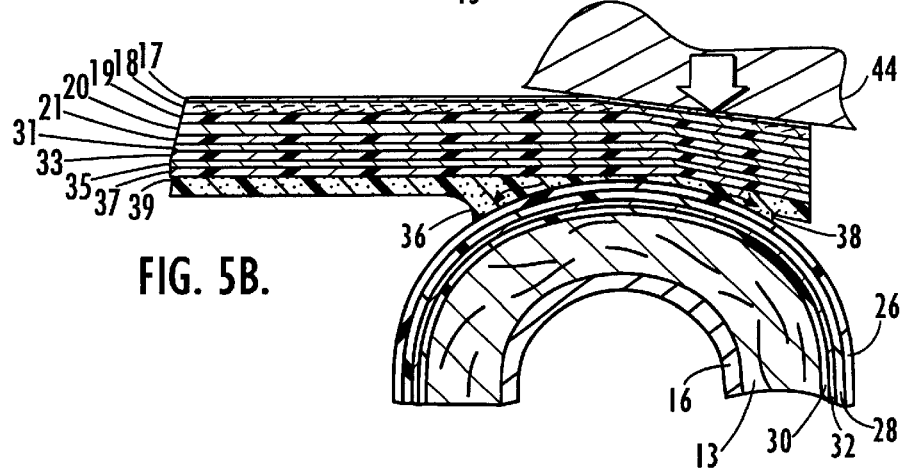
FIG. 5B is an enlarged sectional view of one embodiment of the sealing head of the heat sealing apparatus of the present invention contacting the lid of the container and forcing the flowable portion of the sealant composition preferentially towards the interior of the container.
Figure 5C:
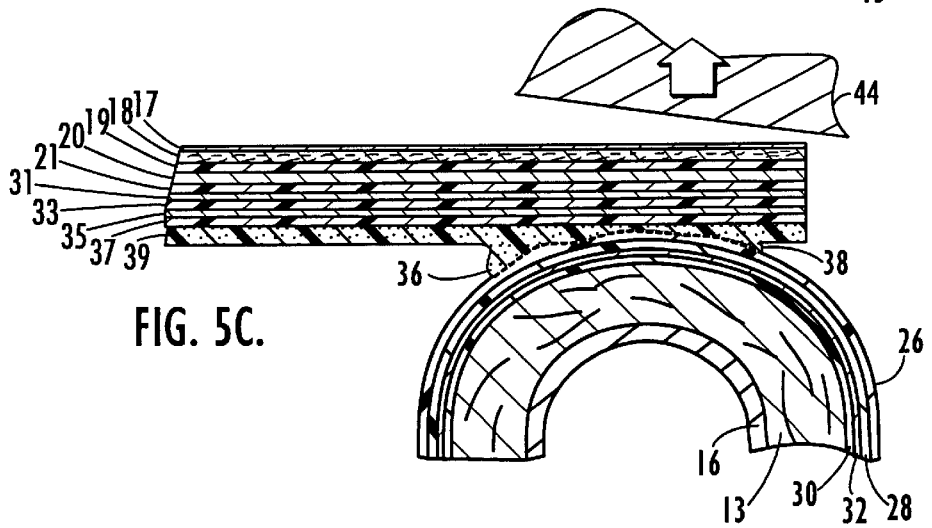
FIG. 5C is an enlarged sectional view of the sealed end of a container of the present invention after the sealing operation.

A method and apparatus for sealing a container for products is also provided. The sealing method and apparatus are illustrated in FIGS. 5A–5C. The heat seal may be created using any suitable apparatus known in the art. Using some sealing systems known in the art, wax is applied to the rim 15 to hold the lid 11 in place prior to formation of the heat seal. As noted above, the seal layer 22 of the lid 11 allows the formation of a heat seal having sufficient bond strength despite the presence of wax in the heat seal area. The present invention is also compatible with sealing systems that utilize a vacuum system to initially hold the lid 11 in place prior to the heat sealing operation.

Using either apparatus, the heat sealing method of the present invention includes providing a tubular member having a paperboard layer 13 and liner ply 14 adhered to the inner surface of the paperboard layer. As described above, one embodiment of the liner ply 14 includes a barrier layer 28 and a seal layer 26, the seal layer defining the innermost surface of the liner ply and comprising a heat sealable composition. Once an end of the tubular member is rolled outwardly to form a rim 15, a lid 11 is contacted with the liner ply 14. The lid 11 includes a barrier layer 20 and a seal layer 22. The seal layer 22 of the lid 11 is contacted with the seal layer 26 of the liner ply 14. The two seal layers 22, 26 are then heated under conditions sufficient to render the heat sealable compositions, such as the frangible layer 39, flowable and pressed together so as to preferentially encourage more flow of the heat sealable compositions in the direction of the interior of the container to form two beads of material, an inner bead 36 and an outer bead 38, wherein the inner bead contains a larger amount of the heat sealable compositions than the outer bead.

In a preferred embodiment, the pressing step is accomplished by pressing the seal layers 22, 26 together using an inclined surface, such as inclined heat sealing head 44. The heat sealing head 44 is preferably constructed of metal, such as aluminum, coated copper or other heat conductive material. In the embodiment shown, the heat sealing head 44 is heated by heat source 46. The heat source may be any suitable type of heat source known in the art. However, the heat sealing head 44 does not have to be heated. The heat seal layers 22, 26 could be heated independently using a separate heat source. The heat sealing head 44 has an engaged sealing position in contact with the lid 11 and a disengaged position. The heat sealing head 44 is moved between the two positions by an actuator 48. The actuator 48 may be any type of actuator known in the art, including mechanical, pneumatic, and the like.

The angle of the inclined surface of the heat sealing head 44 affects the amount of material that flows to form the beads as well as the relative size of the beads. The angle of the inclined surface of the heat sealing head 44 is about 2 to about 20 degrees, preferably about 7 to about 12 degrees. In one embodiment, the angle of the inclined surface is about 10 degrees. In another embodiment, the angle is about 3 degrees. The inclined surface of the head 44 causes molten polymer from the seal layers to move towards the interior of the container to form the inner bead. As this movement occurs, the molten polymer advantageously "fills in" any irregularities in the liner and lid surfaces, thus improving the integrity of the seal.

The heat sealing conditions, such as temperature, pressure, and time, depend on a number of factors, including the heat sealable compositions used and the thickness of the heat seal layers.

Figure 6:
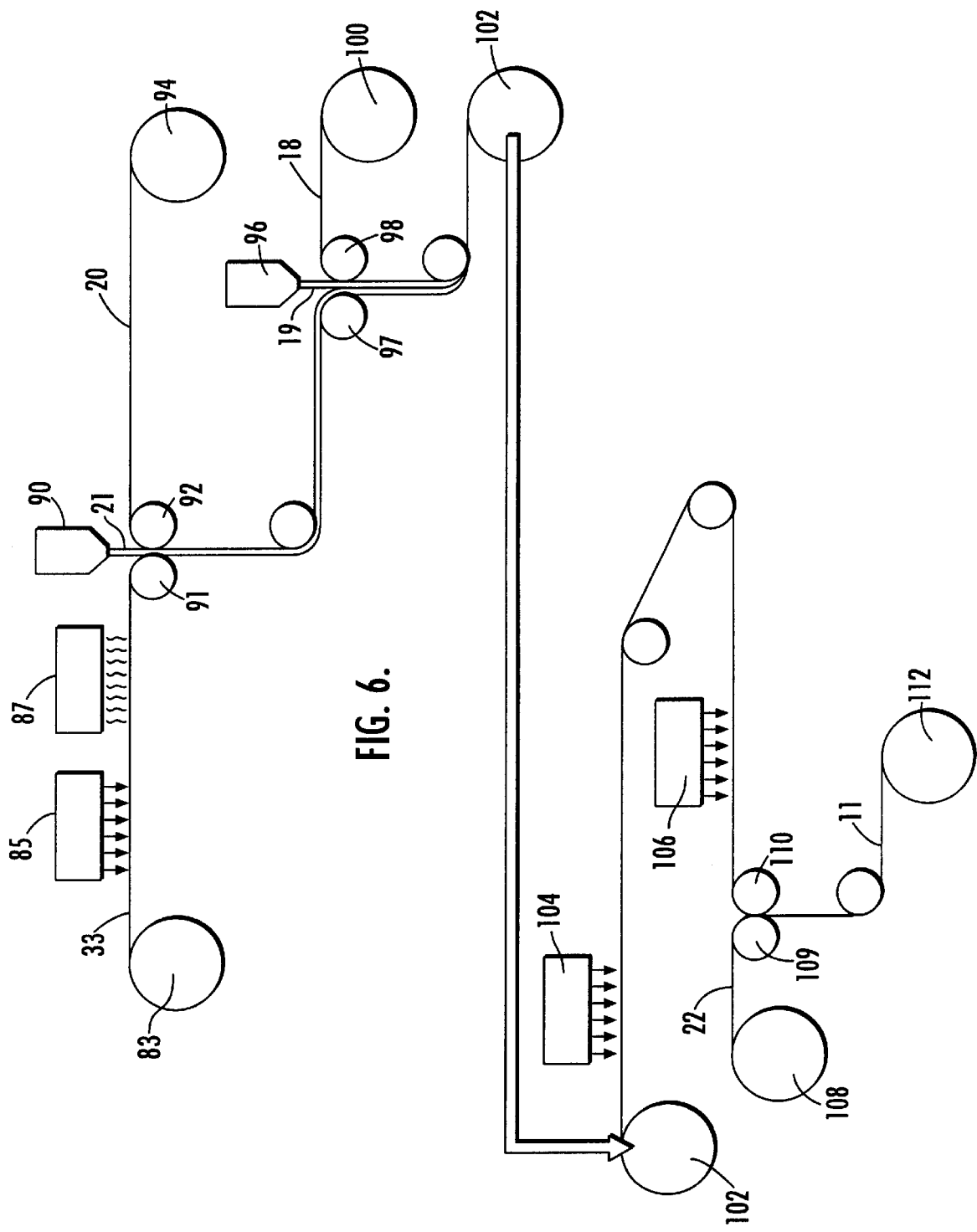
FIG. 6 is a schematic view of a process for constructing the container lid of the present invention.

The lid 11 of the present invention may be manufactured by the process illustrated in FIG. 6. As shown, a continuous roll 83 of the support layer 33 may be advanced to a primer coating station 85, wherein the primer layer is applied to an exposed surface of the support layer 33. Thereafter, the coated surface of the support layer 33 is advanced through a drying station 87 in order to dry the primer layer 31. The coated support layer 33 is then advanced into a lamination nip comprising two rollers, 91 and 92. A continuous roll 94 of barrier layer 20 is also advanced into the lamination nip defined by rollers 91 and 92. An extruder 90 positioned adjacent to the lamination nip directs an adhesive composition 21 into the lamination nip such that the barrier layer 20 and the support layer 33 are laminated together with the adhesive composition 21 therebetween.

The resulting laminate is then advanced to a second lamination nip defined by rollers 97 and 98. A continuous roll of paper layer 18 is also advanced into the lamination nip defined by rollers 97 and 98. A second extruder 96 directs adhesive composition 19 into the lamination nip such that the paper layer 18 is laminated to the exposed surface of barrier layer 20 with the adhesive composition 19 therebetween. The resulting laminate is collected by a collection roll 102.

The laminate wound onto collection roll 102 is then advanced through a printing station 104, wherein printed indicia are applied to the exposed surface of the paper layer 18. Printing station 104 may utilize any conventional printing technique known in the art, including rotogravure, flexographic printing and the like. The laminate is advanced to a third lamination nip defined by rollers 109 and 110. The sealant composition 22 of the present invention is also advanced to the lamination nip from supply roll 108. An adhesive composition 35 is applied to the exposed surface of the support layer 33 at coating station 106. Alternatively, the adhesive composition 35 may be applied to the exposed surface of the seal layer 22. Further, if the adhesive composition 35 is an extruded or coextruded polymer composition, the adhesive composition may be directed into the third lamination nip described above. The laminate is adhered to the seal layer 22 by the lamination nip with the adhesive composition 35 therebetween. The seal layer 22 is positioned such that the base layer 37 is facing the support layer 33 and is adhered thereto. The resulting lid 11 material is advanced to collection roll 112. Preferably, if a thermosetting adhesive composition is used, the adhesive composition 35 is allowed to cure for a period of time, such as about 24 hours, before the lidding material is subjected to further processing. In another embodiment, the seal layer 22 may be formed as a coextruded coating on the surface of the next adjacent layer, such as the support layer 33.

The containers 10 of the present invention may be manufactured by the process illustrated in FIG. 7. As shown, a continuous strip of paperboard body ply material 13 is supplied to the apparatus and is first passed through a pair of opposed edge skivers 50. The edge skivers remove part of the square edge of the body ply 13 to create first 52 and second 54 edges having a beveled configuration. The body ply 13 is then advanced through an adhesive applicator 56, which applies an adhesive 21 to the upper surface of the body ply 13. The adhesive 21 is advantageously an aqueous adhesive, which overcomes the many problems associated with solvent based adhesives. No special equipment is needed to capture solvents that evaporate from the adhesive in order to comply with environmental regulations. Preferred adhesives are aqueous low glass transition temperature ethylene vinyl acetate (>18%) materials. One preferred adhesive is No. 72-4172, which is available from the National Starch and Chemical Company. Another adhesive that may be used is No. 33-4060, which is also available from the National Starch and Chemical Company. The adhesive 21, as well as other adhesive layers used to construct the container 10, may be applied in the form of a foam as described in copending U.S. patent application Ser. No. 09/197,275 entitled, "Composite Container Having Foamed Adhesive," which is assigned to the assignee of the present invention and hereby incorporated by reference.

The body ply 13 and wet adhesive 21 applied thereto are then passed underneath a heater 58 which evaporates at least part of the water content of the aqueous adhesive 21 to render the adhesive substantially tacky. It is important that the correct amount of heat is supplied to the adhesive. Insufficient heat will not evaporate enough water in a sufficiently short period of time with the result that the adhesive will not be rendered sufficiently tacky. Conversely, too much heat will overdry the adhesive and cause the adhesive to lose tackiness. A preferred type of heat source is an infrared heater although various other heat sources, e.g., forced air heating or the like can be used. After heating the adhesive 21 on the body ply 13, the body ply 13 and the liner ply 14 are fed to the shaping mandrel from opposite directions. The body ply 13 is passed under skive adhesive applicator 60 which applies the skive adhesive 59 to the beveled surface of the skived second edge 54 of the body ply 13. The skive adhesive 59 is preferably a hot melt adhesive of the type which is conventional in the art, although it could also be a water based adhesive including one or more polymers. Polyvinyl acetate and ethylene vinyl acetate are the preferred liquid adhesives. The skive adhesive 59 helps provide a stronger body ply bond especially for single body ply containers.

The surface of the liner ply 14 that contacts the body ply 13 is subjected to a corona treatment station 62. The opposite surface of liner ply 14 is coated with lubricant from a roller 64, which allows the liner ply to slide smoothly during the winding operation.

The liner ply 14 is then passed under an infrared heater 66, which heats the second marginal edge portion 42 of the liner ply. After the infrared heater 66, the second marginal edge portion 42 of the liner ply 14 is then passed under at least one forced air heater 68.

The body ply 13 and the liner ply 14 are then wrapped around a shaping mandrel 70 from opposite sides of the mandrel. Each ply is first wrapped under the mandrel 70 and then back over the top in a helical fashion with the liner ply 14 wound against the surface of the mandrel. The first marginal edge portion 41 of the liner ply 14 is exposed on the mandrel 70 and is subjected to heat from a second forced air heater 72.

As the body ply 13 is further wrapped and the first edge 52 of the body ply 13 advances back under the mandrel 70 after one complete revolution, it is brought into contact with the second edge 54 of the ensuing portion of the body ply 13 which is first coming into contact with the mandrel. The skived edges 52, 54 become abutted together and the skive adhesive 59 adheres the edges together to form a spirally wound tube which advances along the mandrel 70.

With regard to the liner ply 14, the first marginal edge portion 41 is brought into an overlapping relationship with the second marginal edge portion 42 to create a sealed straight lap seam. The seal is formed by a polymeric adhesive layer 30 of the first marginal edge 41 becoming bonded to the second marginal edge 42. However, a strip of hot melt adhesive could alternatively be used for securing and sealing the liner overlap.

The tube is then advanced down the mandrel 70 by a conventional winding belt 74, which extends around a pair of opposed pulleys 76. The winding belt 74 not only rotates and advances the tube, but also applies pressure to the overlapping edges of the body ply 13 and liner ply 14 to ensure a secure bond between the respective ply edges.

An outer label ply 16 is then preferably passed over an adhesive applicator 78 and wrapped around the body ply 13. The label ply 16 could be applied before the winding belt 74. At a cutting station 80, the continuous tube is cut into discrete lengths and removed from the mandrel 70.

The ends of the containers 10 are then rolled outwardly to form the rim 15 and the lid 11 is subsequently heat sealed thereto as described above. An end closure, such as a metal closure, is attached to the other end of the container 10. Typically, the lid 11 and end closure 12 are applied to one end of the container 10 prior to filling of the container. After filling, an end closure is applied to the opposing end.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, the tubular containers according to the present invention are not necessarily helically wound but may instead be longitudinally wrapped to create a "convolute" tube having an axially extending seam. In addition, although the tubular containers according to the present invention have been described primarily in connection with food products, it is to be understood that the containers could be used in connection with other products where the liner ply is advantageous such as, for example, ink or caulk. Although specific terms are employed herein, they are used in a generic and descriptive sense only and not for purposes of limitation.

That which is claimed:

1. A sealed composite container for products, comprising:
   a tubular body member comprising at least one paperboard body ply and having an inner surface;
   a liner ply adhered to the inner surface of said tubular body member and comprising a barrier layer, at least one end of said body member and said liner ply being rolled outwardly to form a rim and exposing said liner ply; and
   a lid operatively positioned adjacent to said rim and heat sealed thereto, said lid comprising,
      a barrier layer for preventing the passage of undesirable substances into or out of the container, and
      a dual-layer sealant composition operatively connected to said barrier layer, said sealant composition comprising,
         a base layer, and
         a frangible layer adjacent to said base layer, said frangible layer being positioned so as to face said rim for heat sealing thereto, wherein said frangible layer consists essentially of a polymer selected from the group consisting of ethylene-methyl acrylate copolymers, ionomeric polymers, ethylene-vinyl acetate copolymers, ethylene-methacrylic acid copolymers, and ethylene-acrylic acid copolymers.

2. A container according to claim 1, wherein said base layer comprises a polyolefin.

3. A container according to claim 2, wherein said polyolefin comprises high density polyethylene.

4. A container according to claim 1, wherein said frangible layer consists essentially of an ethylene copolymer.

5. A container according to claim 4, wherein said ethylene copolymer comprises ethylene-methyl acrylate copolymer.

6. A container according to claim 5, wherein said copolymer comprises about 15 to about 25 weight percent methyl acrylate.

7. A container according to claim 1, wherein said base layer is selected from the group consisting of high density polyethylene, polypropylene and polystyrene.

8. A container according to claim 1, wherein said sealant composition comprises a coextrusion coating.

9. A container according to claim 1, wherein said sealant composition comprises a blown film.

10. A container according to claim 1, wherein said base layer is between about 0.1 and about 1.0 mil in thickness.

11. A container according to claim 1, wherein said frangible layer is between about 0.5 and about 2.0 mil in thickness.

12. A container according to claim 1, wherein said heat seal has sufficient burst strength to maintain a hermetic seal when exposed to a vacuum of 10 in. of Hg at room temperature for thirty minutes.

13. A container according to claim 1, wherein said liner ply further comprises a seal layer operatively positioned as the innermost layer of said liner ply and adjacent to said frangible layer of said lid, said seal layer of said liner ply selected from the group consisting of high density polyethylene, low density polyethylene, metallocene-catalyzed polyolefins, and mixtures thereof.

14. A container according to claim 1, wherein said barrier layer of said liner ply is selected from the group consisting of foil, polyamide, metallized polyamide, polyvinylidiene chloride, polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol and mixtures thereof.

15. A container according to claim 1, wherein said barrier layer of said lid is selected from the group consisting of foil, polyamide, metallized polyamide, polyvinylidiene chloride, polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol and mixtures thereof.

16. A container according to claim 1, further comprising a support layer operatively connected to said barrier layer of said lid.

17. A container according to claim 16, wherein said support layer is selected from the group consisting of polyethylene terephthalate, polyamide, polyethylene, polypropylene, foil or metallized versions thereof.

18. A container according to claim 1, further comprising a kraft paper layer operatively connected to said barrier layer of said lid.

19. A container according to claim 18, further comprising printed indicia carried by a surface of said kraft paper layer.

20. A container according to claim 1, wherein said frangible layer of said lid is sealed to said liner ply such that the bond strength between said frangible layer of said lid and said liner ply is greater than the bond strength between said frangible layer and said base layer.

21. A lid for sealing a composite container, comprising:
a barrier layer for preventing the passage of undesirable substances into or out of the container, and
a dual-layer sealant composition operatively connected to said barrier layer, said sealant composition comprising a base layer and a frangible layer adjacent to said base layer, said frangible layer being operatively positioned for heat sealing to a container, wherein said frangible layer consists essentially of a polymer selected from the group consisting of ethylene-methyl acrylate copolymers, ionomeric polymers, ethylene-vinyl acetate copolymers, ethylene-methacrylic acid copolymers, and ethylene-acrylic acid copolymers.

22. A lid according to claim 21, wherein said base layer comprises a polyolefin.

23. A lid according to claim 22, wherein said polyolefin comprises high density polyethylene.

24. A lid according to claim 21, wherein said frangible layer consists essentially of an ethylene copolymer.

25. A lid according to claim 24, wherein said ethylene copolymer comprises ethylene-methyl acrylate copolymer.

26. A lid according to claim 25, wherein said copolymer layer comprises about 15 to about 25 weight percent methyl acrylate.

27. A lid according to claim 21, wherein said base layer is selected from the group consisting of high density polyethylene, polypropylene and polystyrene.

28. A lid according to claim 21, wherein said base layer is between about 0.1 and about 1.0 mil in thickness.

29. A lid according to claim 21, wherein said frangible layer is between about 0.5 and about 2.0 mil in thickness.

30. A lid according to claim 21, wherein said sealant composition comprises a coextrusion coating.

31. A lid according to claim 21, wherein said sealant composition comprises a blown film.

32. A lid according to claim 21, wherein said barrier layer is selected from the group consisting of foil, polyamide, metallized polyamide, polyvinylidiene chloride, polyethylene terephthalate, modified polyethylene terephthalate, metallized polyethylene terephthalate, metallized modified polyethylene terepbthalate, polyethylene napthalate, metallized polyethylene napthalate, metallized polypropylene, metal oxide and silicate coated polyester, metal oxide and silicate coated polypropylene, ethylene vinyl alcohol and mixtures thereof.

33. A lid according to claim 21, further comprising a support layer operatively connected to said barrier layer.

34. A lid according to claim 21, further comprising a kraft paper layer operatively connected to said barrier layer.

35. A method of manufacturing a lid for sealing a composite container, comprising the steps of:
providing a support layer substrate having a first surface and a second surface;
adhering a barrier layer to the first surface of the support layer substrate;
adhering a paper layer to the exposed surface of the barrier layer; and
adhering a dual-layer sealant composition to the second surface of the support layer substrate, the sealant composition comprising a base layer and an adjacent frangible layer.

36. A method according to claim 35, wherein the base layer of the sealant composition comprises high density polyethylene and the frangible layer comprises an ethylene-methyl acrylate copolymer.

37. A method according to claim 35, further comprising the steps of applying a primer coating to the first surface of the support layer substrate and drying the primer coating prior to adhering the barrier layer to the first surface of the support layer substrate.

38. A method according to claim 35, wherein said step of adhering the barrier layer to the first surface of the support layer substrate comprises:
   advancing the support layer substrate and the barrier layer to a lamination nip;
   directing a coextruded polymer composition into the lamination nip; and
   laminating the support layer substrate to the barrier layer with the coextruded polymer composition therebetween.

39. A method according to claim 35, wherein said step of adhering a paper layer to the exposed surface of the barrier layer comprises:
   advancing the barrier layer and the paper layer to a lamination nip;
   directing a coextruded polymer composition into the lamination nip; and
   laminating the barrier layer to the paper layer with the coextruded polymer composition therebetween.

40. A method according to claim 35, wherein said step of adhering a dual-layer sealant composition to the second surface of the support layer substrate comprises:
   applying an adhesive composition to at least one of the second surface of the support layer substrate and a surface of the sealant composition; and
   laminating the sealant composition to the second surface of the support layer substrate with the adhesive composition therebetween.

41. A method according to claim 40, wherein said applying step comprises applying an adhesive composition selected from the group consisting of thermosetting adhesives, extruded polymer compositions, and coextruded polymer compositions.

42. A method according to claim 35, wherein said step of adhering a dual-layer sealant composition to the second surface of the support layer substrate comprises coextruding a dual-layer sealant composition onto the second surface of the support layer substrate.

43. A method according to claim 35, further comprising the step of printing a layer of indicia on the exposed surface of the paper layer.

44. A method of manufacturing a sealed container for products comprising:
   providing a tubular member comprising at least one paperboard body ply having an inner surface and a liner ply adhered to the inner surface of the body ply, the liner ply comprising a barrier layer;
   rolling outwardly at least one end of the tubular member to form a rim and expose the liner ply;
   providing a lid for closing the end of said tubular member, the lid comprising a barrier layer and a dual-layer sealant composition, the sealant composition comprising a base layer and an adjacent frangible layer, wherein the frangible layer consists essentially of a polymer selected from the group consisting of ethylene-methyl acrylate copolymers, ionomeric polymers, ethylene-vinyl acetate copolymers, ethylene-methacrylic acid copolymers, and ethylene-acrylic acid copolymers;
   positioning the lid against the rim such that the frangible layer contacts the liner ply;
   heating the sealant composition under conditions sufficient to render at least a portion of the frangible layer of the sealant composition flowable; and
   sealing the flowable portion of the frangible layer of the sealant composition to the rim such that the lid is hermetically sealed to the liner ply.

45. A method according to claim 44, wherein said sealing step comprises forming a seal between the frangible layer of the sealant composition and the liner ply such that the bond strength between the frangible layer of the lid and the liner ply is greater than the bond strength between the frangible layer and the base layer.

46. A method according to claim 44, wherein the base layer comprises high density polyethylene and the frangible layer consists essentially of an ethylene-methyl acrylate copolymer.

47. A method according to claim 44, further comprising the step of pressing the flange and the lid together to preferentially encourage flow of the frangible layer in the direction of the interior of the container to form an inner heat seal bead and an outer heat seal bead, the inner heat seal bead being larger in cross-section than the outer heat seal bead.

48. A method according to claim 47, wherein said pressing step comprises pressing the flange and the lid together with an inclined surface to preferentially encourage flow of the frangible layer in the direction of the interior of the container.

49. A method according to claim 44, further comprising the step of peeling the lid from the rim, said peeling step comprising delaminating the base layer of the sealant composition from the heat-sealed portion of the frangible layer such that the heat-sealed portion of the frangible layer remains sealed to the rim.

50. A sealed composite container for products, comprising:
   a tubular body member comprising at least one paperboard body ply and having an inner surface;
   a liner ply adhered to the inner surface of said tubular body member and comprising a barrier layer, at least one end of said body member and said liner ply being rolled outwardly to form a rim and exposing said liner ply; and
   a lid operatively positioned adjacent to said rim and heat sealed thereto, said lid comprising,
      a barrier layer for preventing the passage of undesirable substances into or out of the container,
      a kraft paper layer operatively connected to said barrier layer, wherein a surface of said kraft paper layer carries printed indicia, and
      a dual-layer sealant composition operatively connected to said barrier layer, said sealant composition comprising,
         a base layer, and
         a frangible layer adjacent to said base layer, said frangible layer being positioned so as to face said rim for heat sealing thereto.

51. A method of manufacturing a sealed container for products comprising:
   providing a tubular member comprising at least one paperboard body ply having an inner surface and a liner ply adhered to the inner surface of the body ply, the liner ply comprising a barrier layer;
   rolling outwardly at least one end of the tubular member to form a rim and expose the liner ply;
   providing a lid for closing the end of said tubular member, the lid comprising a barrier layer and a dual-layer sealant composition, the sealant composition comprising a base layer and an adjacent frangible layer;

positioning the lid against the rim such that the frangible layer contacts the liner ply;

heating the sealant composition under conditions sufficient to render at least a portion of the frangible layer of the sealant composition flowable;

pressing the flange and the lid together to preferentially encourage flow of the frangible layer in the direction of the interior of the container to form an inner heat seal bead and an outer heat seal bead, the inner heat seal bead being larger in cross-section than the outer heat seal bead; and sealing the flowable portion of the frangible layer of the sealant composition to the rim such that the lid is hermetically sealed to the liner ply.

52. A method according to claim 51, wherein said pressing step comprises pressing the flange and the lid together with an inclined surface to preferentially encourage flow of the frangible layer in the direction of the interior of the container.

* * * * *